US010438264B1

(12) United States Patent
Viswanathan (10) Patent No.: US 10,438,264 B1
(45) Date of Patent: Oct. 8, 2019

(54) ARTIFICIAL INTELLIGENCE FEATURE EXTRACTION SERVICE FOR PRODUCTS

(71) Applicant: Amazon Technologies, Inc., Seattle, WA (US)

(72) Inventor: Krishnamurthy Koduvayur Viswanathan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 345 days.

(21) Appl. No.: 15/253,214

(22) Filed: Aug. 31, 2016

(51) Int. Cl.
| | | |
|---|---|---|
| G06Q 30/00 | (2012.01) |
| G06Q 30/06 | (2012.01) |
| G06N 7/00 | (2006.01) |
| G06N 5/04 | (2006.01) |
| G06N 20/00 | (2019.01) |
| G06F 16/25 | (2019.01) |
| G06F 16/951 | (2019.01) |
| G06F 16/33 | (2019.01) |
| G06F 16/2457 | (2019.01) |

(52) U.S. Cl.
CPC ... *G06Q 30/0623* (2013.01); *G06F 16/24578* (2019.01); *G06F 16/252* (2019.01); *G06F 16/3344* (2019.01); *G06F 16/951* (2019.01); *G06N 5/04* (2013.01); *G06N 7/005* (2013.01); *G06N 20/00* (2019.01)

(58) Field of Classification Search
None
See application file for complete search history.

(56) References Cited

U.S. PATENT DOCUMENTS

| | | |
|---|---|---|
| 5,825,867 A | 10/1998 | Epler et al. |
| 6,246,986 B1 | 6/2001 | Ammicht et al. |
| 6,574,614 B1 | 6/2003 | Kesel |
| 6,629,098 B2 | 9/2003 | Mc et al. |

(Continued)

FOREIGN PATENT DOCUMENTS

| | | |
|---|---|---|
| WO | 2011088053 A2 | 7/2011 |
| WO | 2013180874 | 12/2013 |

OTHER PUBLICATIONS

U.S. Appl. No. 13/360,938, filed Jan. 30, 2012, Titled: System and Method for Evaluating Correction Submissions With Supporting Evidence.

(Continued)

*Primary Examiner* — Mila Airapetian
(74) *Attorney, Agent, or Firm* — Kilpatrick Townsend & Stockton LLP (57) ABSTRACT

Embodiments disclosed herein include artificial intelligence systems and methods for automatically filling or completing required attribute values for features associated with an item that is being offered. In embodiments, an offer for an item may include an image of the item and unstructured text related to the item. Potential candidate values are selected and ranked according to generated confidence scores that represent the correct candidate value for the selected feature. A user interface may be presented to the user offering the item that presented the ranked potential candidate values and request confirmation. In response to the user confirming the candidate value for the feature a web page may be generated for offering the item with appropriate features and attribute values auto-populated thus providing an efficient method for offering items on behalf of a user.

19 Claims, 7 Drawing Sheets

(56) References Cited

U.S. PATENT DOCUMENTS

| | | |
|---|---|---|
| 6,848,002 B1 | 1/2005 | Detlef et al. |
| 6,882,973 B1 | 4/2005 | Pickering |
| 6,920,463 B2 | 7/2005 | Kishimoto et al. |
| 6,924,797 B1 | 8/2005 | MacPhail et al. |
| 6,983,323 B2 | 1/2006 | Cantrell et al. |
| 7,062,440 B2 | 6/2006 | Tucker et al. |
| 7,069,221 B2 | 6/2006 | Crane et al. |
| 7,162,421 B1 | 1/2007 | Zeppenfeld et al. |
| 7,418,392 B1 | 8/2008 | Mozer et al. |
| 7,461,033 B1 | 12/2008 | McConnell et al. |
| 7,477,780 B2 | 1/2009 | Boncyk et al. |
| 7,483,903 B2 | 1/2009 | Kulkarni et al. |
| 7,577,649 B2 | 8/2009 | Wu et al. |
| 7,720,683 B1 | 5/2010 | Vermeulen et al. |
| 7,774,204 B2 | 8/2010 | Mozer et al. |
| 7,848,314 B2 | 12/2010 | Li et al. |
| 7,881,974 B1 | 2/2011 | Thirumalai et al. |
| 7,917,941 B2 | 3/2011 | Wallman et al. |
| 8,000,971 B2 | 8/2011 | Ljolje |
| 8,046,221 B2 | 10/2011 | Ljolje et al. |
| 8,051,040 B2 | 11/2011 | Johnson et al. |
| 8,146,136 B1 | 3/2012 | Siemens et al. |
| 8,180,025 B2 | 5/2012 | Pieraccini et al. |
| 8,374,879 B2 | 2/2013 | Falcon et al. |
| 8,417,223 B1 | 4/2013 | Trivi |
| 8,417,562 B1 | 4/2013 | Siemens et al. |
| 8,489,603 B1 | 7/2013 | Weissgerber et al. |
| 8,515,766 B1 | 8/2013 | Bringert et al. |
| 8,532,269 B2 | 9/2013 | Chambers et al. |
| 8,660,843 B2 | 2/2014 | Falcon et al. |
| 8,688,508 B1 | 4/2014 | Singh et al. |
| 9,026,438 B2 | 5/2015 | Herbig et al. |
| 9,548,066 B2 | 1/2017 | Jain et al. |
| 2002/0026440 A1 | 2/2002 | Nair et al. |
| 2002/0198940 A1 | 12/2002 | Bower et al. |
| 2003/0171928 A1 | 9/2003 | Falcon et al. |
| 2004/0103116 A1 | 5/2004 | Venkataraman et al. |
| 2004/0143516 A1 | 7/2004 | Hastie et al. |
| 2004/0148266 A1* | 7/2004 | Forman .................. G06K 9/626 706/46 |
| 2005/0060324 A1 | 3/2005 | Johnson et al. |
| 2005/0075946 A1 | 4/2005 | Henning et al. |
| 2005/0131704 A1 | 6/2005 | Dragosh et al. |
| 2005/0289168 A1 | 12/2005 | Green et al. |
| 2006/0048016 A1 | 3/2006 | Reindler et al. |
| 2006/0085108 A1 | 4/2006 | Grier et al. |
| 2006/0122858 A1 | 6/2006 | Miles et al. |
| 2006/0212930 A1 | 9/2006 | Shull et al. |
| 2007/0014422 A1 | 1/2007 | Wesemann et al. |
| 2007/0073599 A1* | 3/2007 | Perry .................... G06Q 30/02 705/26.5 |
| 2007/0098351 A1 | 5/2007 | East et al. |
| 2007/0143115 A1 | 6/2007 | Falcon et al. |
| 2007/0219863 A1 | 9/2007 | Park et al. |
| 2007/0297337 A1 | 12/2007 | Beygelzimer et al. |
| 2008/0082352 A1 | 4/2008 | Schmidtler et al. |
| 2008/0089530 A1 | 4/2008 | Bostick et al. |
| 2008/0097835 A1 | 4/2008 | Weiser et al. |
| 2008/0189187 A1 | 8/2008 | Hao et al. |
| 2009/0150156 A1 | 6/2009 | Kennewick et al. |
| 2009/0171960 A1 | 7/2009 | Katzir et al. |
| 2010/0217604 A1 | 8/2010 | Baldwin et al. |
| 2011/0085697 A1* | 4/2011 | Clippard .............. G06K 9/4652 382/100 |
| 2011/0093467 A1 | 4/2011 | Sharp et al. |
| 2011/0289026 A1 | 11/2011 | Kannan et al. |
| 2012/0223885 A1 | 9/2012 | Perez et al. |
| 2012/0245935 A1 | 9/2012 | Wong et al. |
| 2012/0253790 A1 | 10/2012 | Heck et al. |
| 2013/0218574 A1 | 8/2013 | Falcon et al. |
| 2013/0254059 A1* | 9/2013 | Teo ........................ G06Q 30/08 705/26.4 |
| 2013/0288655 A1 | 10/2013 | Foruntanpour et al. |
| 2013/0316679 A1 | 11/2013 | Miller et al. |
| 2014/0018050 A1 | 1/2014 | Isidore |
| 2014/0052438 A1 | 2/2014 | Yerrace et al. |
| 2014/0079324 A1* | 3/2014 | Ishige .................... G06T 11/60 382/224 |
| 2014/0222422 A1 | 8/2014 | Sarikaya et al. |
| 2014/0365209 A1 | 12/2014 | Evermann |
| 2015/0142447 A1 | 5/2015 | Kennewick et al. |
| 2015/0170665 A1 | 6/2015 | Gundeti et al. |
| 2015/0378975 A1 | 12/2015 | Wu et al. |
| 2016/0042748 A1 | 2/2016 | Jain et al. |
| 2016/0342288 A1* | 11/2016 | Konik .............. G06F 16/24578 |
| 2017/0140427 A1* | 5/2017 | Bocanegra ......... G06Q 30/0255 |
| 2017/0186032 A1* | 6/2017 | Rangasamy Kannadasan ............ G06Q 30/0248 |
| 2017/0193581 A1* | 7/2017 | Vasthimal ......... G06F 17/30265 |

OTHER PUBLICATIONS

U.S. Appl. No. 14/107,931, filed Dec. 16, 2013, Titled: Attribute-Based Audio Channel Arbitration.

U.S. Appl. No. 14/314,962, filed Jun. 25, 2014, Titled: Attribute Fill Using Text Extraction.

U.S. Appl. No. 14/456,620, filed Aug. 11, 2014, Titled: Voice Application Architecture.

Pinhanez, Claudio. "The Everywhere Displays Projector: A Device to Create Ubiquitous Graphical Interfaces", IBM Thomas Watson Research Center, *Ubicomp 2001* (Sep. 30-Oct. 2, 2001), 18 pages.

* cited by examiner

ARTIFICIAL INTELLIGENCE FEATURE EXTRACTION SERVICE FOR PRODUCTS

CROSS-REFERENCE TO RELATED APPLICATIONS

This application is related to and incorporates by reference for all purposes the full disclosures of co-pending U.S. patent application Ser. No. 14/314,962, filed Jun. 25, 2014, entitled "ATTRIBUTE FILL USING TEXT EXTRACTION," U.S. Pat. No. 8,688,508, issued Apr. 1, 2014, entitled "SYSTEM AND METHOD FOR EVALUATING CORRECTION SUBMISSIONS WITH SUPPORTING EVIDENCE," U.S. patent application Ser. No. 14/456,620, filed Aug. 11, 2014, entitled "VOICE APPLICATION ARCHITECTURE," and U.S. patent application Ser. No. 14/107,931, filed Dec. 16, 2013, entitled "ATTRIBUTE-BASED AUDIO CHANNEL ARBITRATION."

BACKGROUND

Network-enabled devices allow people to utilize online services to shop, stream music, offer items for sale, etc., without leaving the comfort of their homes or wherever they are. However, users who wish to offer items or services may endure an arduous process that requires time and effort that may result in incomplete and/or abandoned offers. Further, current item offering processes may be prone to error, such as human error, when users are required to input multiple fields required to offer an item. Users may grow frustrated upon receiving automated messages that don't contain helpful information and/or that indicate rejection of their potential listings. For example, a user may attempt to offer an item on an online marketplace. In response, the user may be presented with options to provide several values for the item they intend to list, such things as price, model, brand, specifications, color of the item, weight of the item, dimensions of the item, etc. However, the user may enter incorrect information, forget to submit some values requested, or be unable to complete the fields required due to a time issue. This can result in the user being presented with an indication that the item has failed to list, or that the user has presented incorrect/incomplete information which results in not being able to list the item.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein can be used to facilitate merchants, sellers, users, and other entities that wish to offer an item by automatically providing values for features of the item that are needed to properly list or offer an item in a marketplace via an item offer feature. A user may provide a designation of an item (i.e., a pair of shoes) and an image of an item along with associated unstructured text to a service provider computer that implements the item offer feature described herein. As used herein, structured text includes text that includes an attribute value that has a format, such as those that tend to comprise a number followed by a unit type. For example, the attribute or feature hard_drive_capacity is a structured attribute that has a value that indicates the number of bytes that a hard drive may store, such as 1000 GB or 1 TB. Unstructured text includes text that includes attributes or features that have values that do not follow a format. For example, an item_description attribute may be unstructured because it can contain a number of data in any order. In embodiments, the service provider computer may identify an item category for the item by leveraging a corpus or catalog of items offered by a marketplace. The service implementing the item offer feature may identify or determine a number of key features that are needed to properly offer the item in question. For example, for a pair of shoes, the system may only require a size of the shoes, a color of the shoes, and a brand whereas a pen may only require a color of ink and a type of writing point (i.e., ball point). Thereafter, the service may parse and extract candidate values from the provided text, obtain candidate values from the image of the item, obtain candidate values from similar items within the same item category or from parent categories, or obtain candidate values from other sources such as a manufacturer of the item.

In some embodiments, a portion of the candidate values may be determined for each feature based in part on a model, that is generated by a machine learning algorithm, that generates a confidence score for each candidate value and feature that represents the likelihood that the value is correct for the feature in question. In some embodiments, a training machine learning algorithm, either supervised or unsupervised, may generate a model that can be selected and implemented by a machine learning algorithm to generate confidence scores for candidate values and verify candidate values for a particular feature. In various embodiments, a machine learning algorithm may be utilized to extract or identify features for an item category that corresponds to an item provided by a merchant, user, or other entity such as a third party. In embodiments, the machine learning algorithms or algorithm may implement or learn utilizing a deep learning based approach that can build complex concepts out of simple concepts. Deep learning algorithms may include any suitable algorithm that represents a problem as a nested hierarchy of concepts, which each concept defined in relation to simplet concepts and more abstract representations computed in terms of less abstract representations. Some examples of deep learning algorithms may include recurrent neural networks, or a long short-term memory (LSTM) algorithm. In embodiments, the deep learning algorithms can be utilized to extract machine learning features to train a machine learning algorithm that can in turn generate one or more models for feature extraction from an item category or generate candidate values for said feature. In some embodiments, the service may generate a user interface that contains information about the item, such as an image of the item, an offer price, and candidate values automatically pre-filled for one or more key features needed to properly offer the item. The service may request input from the seller that confirms the selection of a particular candidate value for each feature. If the seller approves of the pre-filled candidate values for the features a listing or offer web page may be generated by the service on behalf of the seller to offer the item in an electronic marketplace with the required features and associated candidate values provided without the seller having to manually enter every value themselves.

In various embodiments the user interface may allow a seller to select a candidate value for the feature or correct the feature with an appropriate candidate value that is not included as a selection. By automatically pre-filling or providing the user with candidate values for the one or more features that correspond to listing an item, human error can be reduced, proper listings that adhere to a minimum amount of information needed to list an item can be maintained, and efficient item offer generation can be achieved dynamically as the service can determine appropriate candidate values and confidence scores for associated features in real time. Further, machine learning algorithms that generate models for identifying features and generating confidence scores can be consistently updated based on the input provided by the seller that either confirms a candidate value for a feature, selects an alternate value for a feature, or provides a feature manually. The updated machine learning algorithms can in turn generate better confidence scores which result in more efficient item offer processing by the service provider computers and provide a more satisfactory experience for sellers and merchants that further results in fewer abandoned or incorrect item offers in an electronic marketplace.

Consider the following example use case. A merchant intends to sell a pair of headphones on an electronic marketplace. The merchant may provide an indication of the item, such as title of "Headphones," an image of said headphones, and a portion of text that may be unstructured such as "Bumps MKL2A/Solo Wireless On-Ear Headphones, Blue," using a mobile phone and user interface displayed on the mobile phone that is provided by an item offer feature service. The service may identify an item category for the headphones such as audio devices, determine required features to properly list the item such as color, connection type, price, model type, etc. The service may further extract values from the unstructured text and other sources to auto-populate a number of the features for a potential listing or offer of the headphones in an electronic marketplace. The merchant may receive, via the user interface, a preview of the listing that includes a candidate value for each feature and confirm or update functionality for each feature of the headphones. The merchant may confirm each candidate value for the required features and thereafter be presented with a notification that the listing is complete and placed on the electronic marketplace.

In some embodiments, a user may utilize a user device, such as a mobile phone, to capture an image of an item they wish to list for sale or offer and provide the image to the service provider computers via one or more available networks such as the Internet. The service provider computers may utilize image recognition techniques to identify an item in the picture and leverage corpus of items offered by an electronic marketplace to find an identical item listing or a similar item listing. Required features can be identified and values can be pre-filled or selected for the features by leveraging the catalog of items or corpus of items already offered by the electronic marketplace. In embodiments, the item offer feature may include generating a preview of a listing or offer of the item and transmit it to the user for confirmation or any updates or addition to the offer that the user feels are necessary such as a change in the title of the offer. Upon the user confirming the listing, the service provider computers may generate a web page or data object for properly offering the item in an online marketplace such as an electronic marketplace.

In some embodiments, a user may be presented with multiple potential candidate values for a feature that are ranked according to confidence scores that are generated by a machine learning algorithm and model for the particular item and/or item category. For example, the candidate value with the highest confidence score for any given feature may be auto-populated or pre-filled for a feature in a user interface. However, the user may interact with the user interface, for example a drop down menu, to select another potential candidate value for the feature. Should none of the candidate values be appropriate or correct for the feature, the user may also provide input to complete the value for the feature. In various embodiments, the machine learning algorithm utilizes the input provided by the user (confirming a candidate value, selecting another candidate value, or manually providing a value) as data points to update the models that generate the confidence scores for an item and/or item category.

In some embodiments, candidate values for the features can be determined based on a number of information sources. For example, candidate values can be extracted from information provided by the user with the item (i.e., unstructured/structured text, characteristics obtained from an image), manufacturers of the item, user reviews of the item in an electronic marketplace, editorial pieces for an item, responses to queries for an item that are maintained by an electronic marketplace, or other suitable information sources such as similar items in the same item category or from items in a parent category. In some embodiments, the service computer may maintain or assign a weighted factor to each user, seller, or merchant that offers an item. The weighted factor may represent a veracity of the user when providing items that can be generated based on input from other users (other merchants or buyers of items from the particular merchant). In embodiments, the weighting factor for a merchant can be used to adjust the effect of the input (confirmation, denial) of candidate values to features provided during an item listing on a corresponding model and/or machine learning algorithm. In various embodiments, a user may interact with a voice-activated component to invoke the item offer features described herein. In embodiments, the service computers may provide a series of queries and other information, via the voice-activated component, to confirm candidate values for features and inform the user that the item has been properly listed. In embodiments, a presentation of potential candidate values and features for offering an item may be updated or altered based on a device type that the user utilized to interact with the item offer feature. For example, if a merchant begins the process by providing a picture of an item via an associated mobile phone, the service provider computers may select a smaller portion or subset of candidate values to provide for display with a feature in a preview that is transmitted to the mobile phone. In embodiments, the voice-activated component may comprise a microphone that is associated with a speaker component or the voice-activated component and speaker component may be separate components that work in conjunction to receive and process voice commands and provide queries to the user. In embodiments, an application of a user device may utilize auditory components of the user device to communicate with the user about item offers and verifying candidate values for features utilizing two way communication techniques. In embodiments, a dialog may occur between a voice-activated component, software application, etc., and a user. A dialog may include a sequence or series of speech expressions that may include system-generated and user-uttered speech. For example, the user may speak a command, and the voice-activated component may respond with a speech message asking for clarification. When the service has received enough information, it may begin the process of identifying an item category and features for a potential offered item, and generate candidate values with corresponding candidate scores for the identified features.

In some embodiments, a third party or other computer system may call or invoke a service that provides a candidate value and extraction features for data provided by the third party or other computer system. For example, a third party may provide a set of data that includes a current catalog of offered items, information received that corresponds to items being offered by the third party, or other suitable information. The extraction feature service described herein can utilize the provided information and apply similar models and machine learning algorithms to identify relevant features, generate potential candidate values for the identified features, and rank the potential candidate values for the features. The resultant data set can then be transmitted back to the requesting entity for use in enriching an item offer catalog. In embodiment, item categories and item matching can occur by leveraging an item catalog maintained by an associated electronic marketplace that implements the feature identification and candidate value features described herein. Entities may invoke the service by invoking an application programming interface (API) offered by the service described herein or otherwise communicating with the service via available networks such as the Internet.

Various embodiments will now be discussed in greater detail with reference to the accompanying figures, beginning with FIG. 1.

Figure 1:
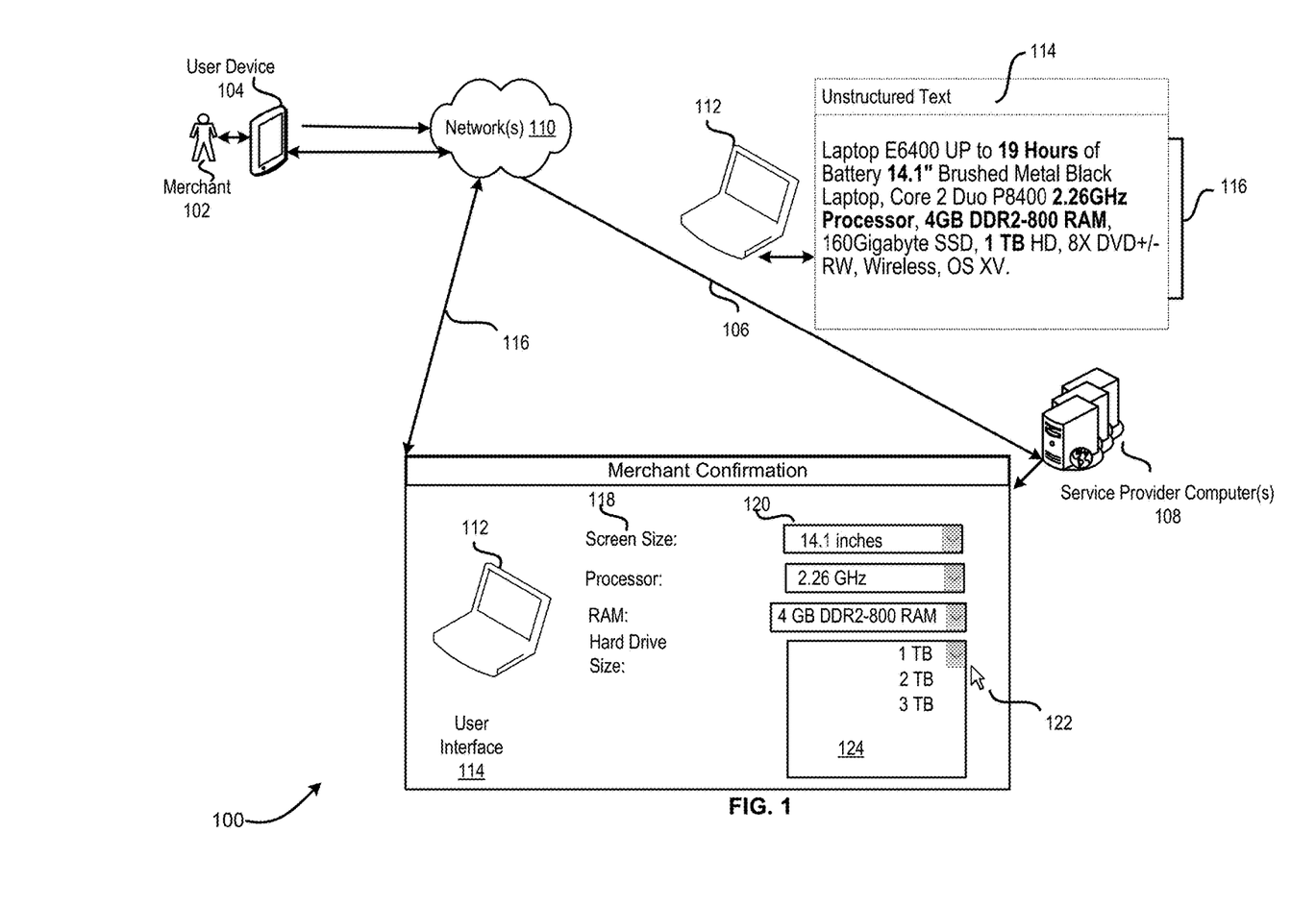
FIG. 1 illustrates an example workflow for an item offer feature, in accordance with at least one embodiment.

FIG. 1 illustrates an example workflow for an item offer feature, in accordance with at least one embodiment. FIG. 1 depicts a workflow 100 for an item offer feature according to embodiments described herein. FIG. 1 includes a merchant 102 using a user device 104 (such as a tablet computer) to provide an indication of an item offer 106 to service provider computers 108 via available networks 110. The indication of the item offer 106 in FIG. 1 includes an image of the item 112 (a laptop) and unstructured text 114 that includes one or more values 116 for features of the item 112. In some embodiments, the indication of the item offer 106 may include other information such as a title for the item 112 or listing 106 or structured text for the item 112 (not pictured). In some embodiments, the service provider computers 108 may identify a category associated with the item 112, such as computers, and determine a number of features that are required to properly offer the item 112 in an electronic marketplace. The service provider computers 108 may maintain a plurality of thresholds that indicate a minimum amount of features required for each item and/or item category.

In embodiments, the service provider computers 108 may extract or obtain a plurality of candidate values for each feature from various sources including the unstructured text 114 or characteristics of the item obtained from the image 112. In embodiments, the service provider computers 108 may generate a user interface 114 that can be transmitted 116 to the merchant 102 via the user device 104 and networks 110. The user interface 114 depicted in FIG. 1 includes a number of identified features 118 and corresponding candidate values 120 for features 118 that have been determined by the service provider computers 108. The user interface 114 may be transmitted 116 to the merchant 102 to confirm the candidate values 120 for the features 118. The merchant 102 may also interact 122 (via a mouse pointer for example) with the user interface 114 to select a particular candidate value from a subset of candidate values 124 for a particular feature.

As depicted in FIG. 1, the user interface includes a drop down menu for selection of a particular candidate value from a subset of candidate values 124 for the hard drive size. In various embodiments, upon the merchant 102 confirming the candidate values 120 for the features 118, the service provider computers 108 may generate a listing that may be include a web page, a data object, an application object, a user interface update or notification, or other suitable information for offering the item (laptop) in an online marketplace or electronic marketplace. For example, the service provider computers 108 may generate an offer web page that can be provided to an electronic marketplace that will begin listing and offering the item for sale upon confirmation from the merchant 102. In some embodiments, the service provider computers 108 may provide a confirmation notification or message to the merchant 102 via the user device 104 identifying that the item (laptop) has been successfully listed or offered via the electronic marketplace.

Figure 2:
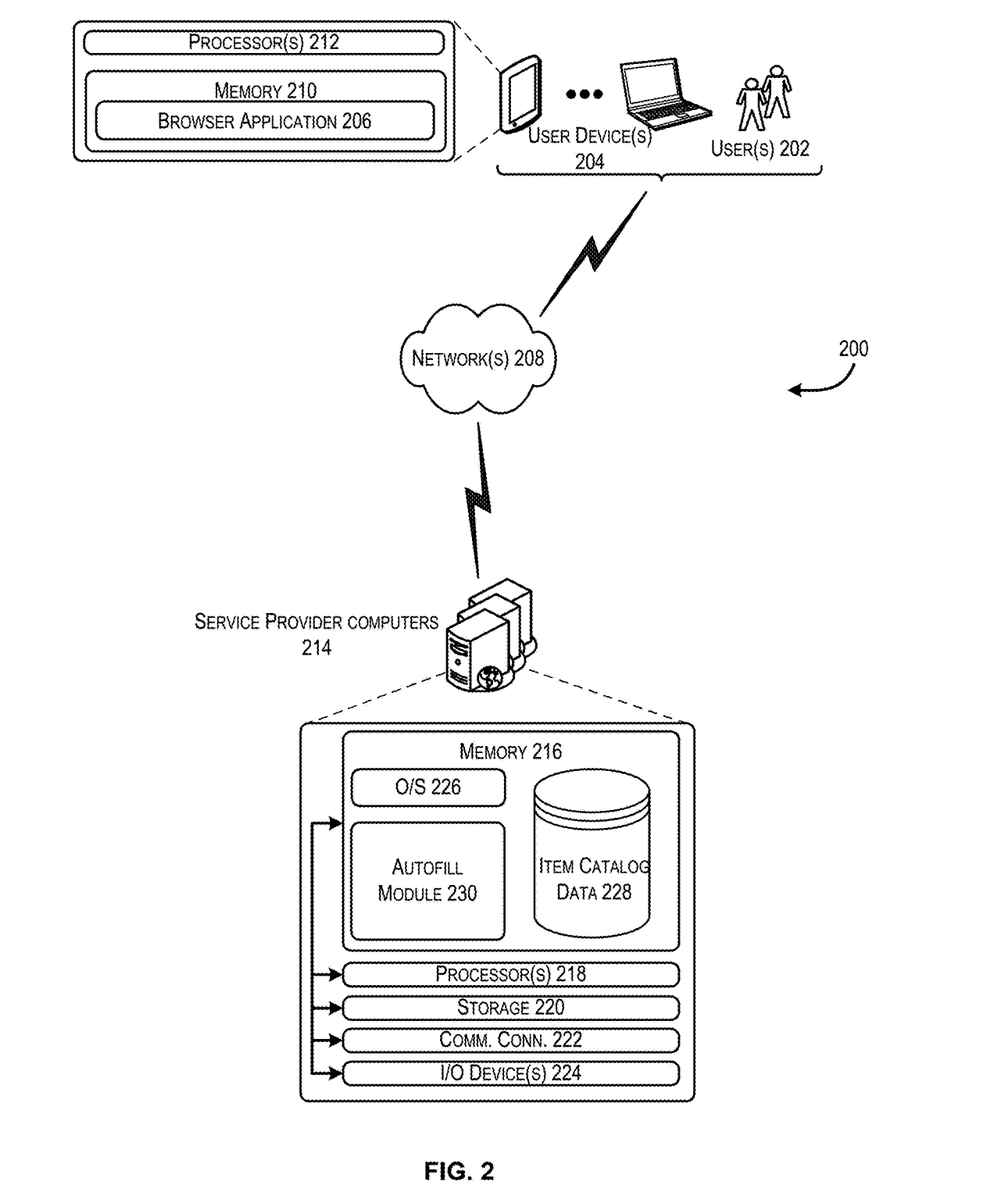
FIG. 2 illustrates an example architecture for implementing an item offer feature, in accordance with at least one embodiment.

FIG. 2 illustrates an example architecture for implementing an item offer feature, in accordance with at least one embodiment. In architecture 200, one or more users 202 (e.g., merchants, sellers, item fulfillment service users, or users) may utilize user computing devices 204(1)-(N) (collectively, user devices 204) to access a browser application 206 or a user interface (UI) accessible through the browser application 206, via one or more networks 208 to provide information identifying an item to offer, such as by providing an image of the item and unstructured text about the item as described herein. The "browser application" 306 can be any browser control or native application that can access and display a network page or other information. A native application may include an application or program that has been developed for use on a particular platform (such as an operating system) or a particular device (such as a particular type of mobile device).

The user devices 204 may include at least one memory 210 and one or more processing units or processor(s) 212. The memory 210 may store program instructions that are loadable and executable on the processor(s) 212, as well as data generated during the execution of these programs. Depending on the configuration and type of the user devices 204, the memory 210 may be volatile (such as random access memory (RAM)) and/or non-volatile (such as read-only memory (ROM), flash memory, etc.). The user devices 204 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 204. In some implementations, the memory 210 may include multiple different types of memory, such as static random access memory (SRAM), dynamic random access memory (DRAM), or ROM.

Turning to the contents of the memory 210 in more detail, the memory 210 may include an operating system and one or more application programs or services for implementing the features disclosed herein. Additionally, the memory 210 may include one or more modules for implementing the features described herein.

The architecture 200 may also include one or more service provider computers 214 that may, in some examples, provide computing resources such as, but not limited to, client entities, low latency data storage, durable data storage, data access, management, virtualization, hosted computing environment or "cloud-based" solutions, electronic content performance management, etc. The one or more service provider computers 214 may implement or be an example of the service provider computer(s) 108 of FIG. 1. The one or more service provider computers 214 may also be operable to provide site hosting, computer application development, and/or implementation platforms, combinations of the foregoing, or the like to the one or more users 202.

In some examples, the networks 208 may include any one or a combination of many different types of networks, such as cable networks, the Internet, wireless networks, cellular networks and other private and/or public networks. While the illustrated example represents the users 202 communicating with the service provider computers 214 over the networks 208, the described techniques may equally apply in instances where the users 202 interact with the one or more service provider computers 214 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 214 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 214 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 214 may be in communication with the user device 204 via the networks 208, or via other network connections. The one or more service provider computers 214 may include one or more servers, perhaps arranged in a cluster or as individual servers not associated with one another.

In one illustrative configuration, the one or more service provider computers 214 may include at least one memory 216 and one or more processing units or processors(s) 218. The processor(s) 218 may be implemented as appropriate in hardware, computer-executable instructions, firmware, or combinations thereof. Computer-executable instruction or firmware implementations of the processor(s) 218 may include computer-executable or machine-executable instructions written in any suitable programming language to perform the various functions described when executed by a hardware computing device, such as a processor. The memory 216 may store program instructions that are loadable and executable on the processor(s) 218, as well as data generated during the execution of these programs. Depending on the configuration and type of the one or more service provider computers 214, the memory 216 may be volatile (such as RAM) and/or non-volatile (such as ROM, flash memory, etc.). The one or more service provider computers 214 or servers may also include additional storage 220, which may include removable storage and/or non-removable storage. The additional storage 220 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 216 may include multiple different types of memory, such as SRAM, DRAM, or ROM.

The memory 216, the additional storage 220, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 216 and the additional storage 220 are all examples of non-transitory computer storage media. Additional types of non-transitory computer storage media that may be present in the one or more service provider computers 214 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the one or more service provider computers 214. Combinations of any of the above should also be included within the scope of non-transitory computer-readable media.

The one or more service provider computers 214 may also contain communication connection interface(s) 222 that allow the one or more service provider computers 214 to communicate with a data store, another computing device or server, user terminals and/or other devices on the networks 208. The one or more service provider computers 214 may also include I/O device(s) 224, such as a keyboard, a mouse, a pen, a voice input device, a touch input device, a display, speakers, a printer, etc.

Turning to the contents of the memory 216 in more detail, the memory 216 may include an operating system 226, one or more data stores 228, and/or one or more application programs or services for implementing the features disclosed herein including the autofill module 230. In accordance with at least one embodiment, the autofill module 230 may be configured to at least receive and analyze unstructured text and an image of an item to identify one or more features required to offer the item, extract candidate values from the unstructured text, image characteristics, or from other sources such as a manufacturer, electronic marketplace, etc., generate confidence scores for the candidate value and corresponding feature using machine learning algorithms and models, and generate a user interface object or data object for transmitting and presentation, via a user device, to a user that can confirm a candidate value for a feature prior to generating an offer and/or listing web page, data object, application link, etc., for offering the item in an online marketplace.

Figure 3:
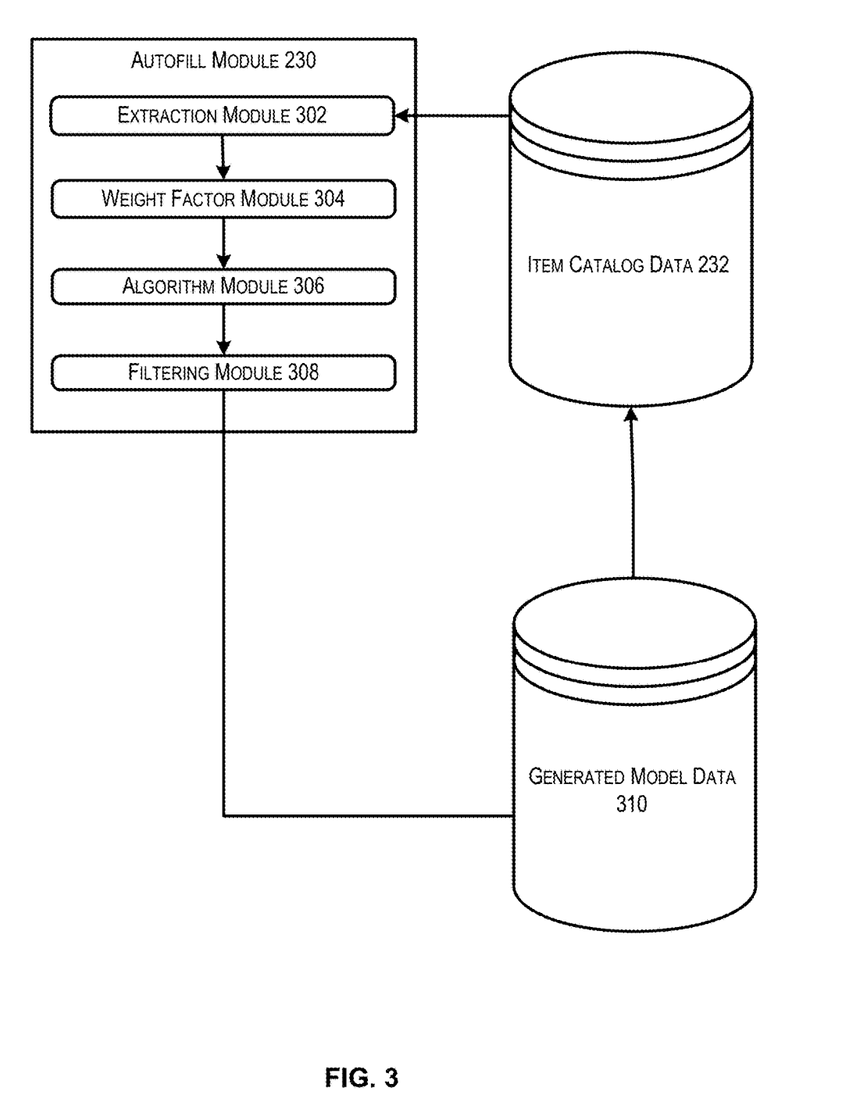
FIG. 3 illustrates an example autofill module, in accordance with at least one embodiment.

FIG. 3 illustrates an example autofill module, in accordance with at least one embodiment. As FIG. 3 illustrates, the autofill module 230 may include an extraction module 302, a weight factor module 304, an algorithm module 306, and a filtering module 308 in communication with an item catalog data store 232 and a generated model data store 310. In embodiments, the processor 218 and/or the processor 212 may be configured to implement and enable the processes and operations described herein for the modules 230, 302, 304, 306, and 308. In embodiments, the extraction module 302 may be configured to identify one or more features or key features for an item that a merchant, seller, or user intended to sell or offer via an online marketplace. The features or key features may be required in order to properly list or offer an item in order to include enough information to inform a potential buyer about the item to make a purchase decision. In embodiments, the extraction module 302 may maintain a plurality of thresholds that identify a number and type of features required for each item and/or item category. For example, a first threshold may indicate that a color of ink, manufacture, and writing type are required features to list a pen whereas a second threshold may identify that a display size, resolution, refresh rate, weight, and physical dimensions for a television may be required to properly offer a TV. In embodiments, the extraction module 302 may be in communication with the item catalog data store 232 which maintains and updates the feature thresholds described herein. In embodiments, the extraction module 302 may be configured to extract values from information provided by a merchant including candidate values extracted from the unstructured text or image characteristics obtained from a provided image. In embodiments, the extraction module 302 may extract or identify a number of candidate values for a feature from other sources such as a manufacturer of the item in question, from reviews of the item that are maintained by an electronic marketplace, or other suitable sources as described herein including values that may be inherited from parent item categories in an item category hierarchy maintained by an electronic marketplace.

In various embodiments, the extraction module 302 may be configured to perform image processing of an image provided by a merchant, seller, user that desires to offer the item included in the image using the item offer features described herein. As described, an item may be identified in the image and features and values may be determined using an item catalog maintained by an electronic marketplace or stored in data store 232. Suitable image processing or item recognition may include analyzing barcodes or labels associated with an item included in the image. The barcodes or labels included in the image may be matched against a barcode or label database to identify the item in the image. In some embodiments, an image may be analyzed via an algorithm to determine image characteristics for each item included in an image. In various embodiments, optical character recognition can be utilized to process labels or tags associated with an item in the image and matched to labels or tags of other items maintained in an item catalog. In embodiments, an image processing algorithm can fragment a picture into multiple portions and process each portion individually to identify items included in an image. In some implementations, a user can individually identify or tag regions or items included in the image to enable an algorithm to identify the items included in the image. Once an item has been identified, a similar process of identifying features, extracting candidate values, generating confidence scores, and presenting a preview or user interface that displays matched candidate values for features of an item may be transmitted to a merchant for confirmation.

In some embodiments, the extraction module 302 may be configured to receive and process an audio file or media file that is captured by a voice-activated component. Text can be identified from the files using a speech to text process and an item, features, and candidate values may be extracted from the files for auto-populating a user interface that represents a potential listing for the item identified in the files. For example, the extraction module 302 may employ any suitable voice or speech recognition technique such as acoustic modeling, language modeling, and natural language processing methods to analyze voice commands, audio files, or media files provided by a merchant intending to sell an item. As a further example, a user may interact with a voice-activated component by stating "I want to sell this pen." In embodiments, the extraction module 302 may utilize the voice recognition or speech recognition techniques to extract the item "pen" from the file and use processes described herein including matching the pen to an item included in an item catalog to determine required features. In some embodiments, the extraction module 302 may generate instructions for communicating with the user via the voice-activated component. For example, the extraction module 302 may generate a series of queries to identify further information required to offer the item or to confirm candidate details for said features. For example, a sample query may include "Is this a blue color ink pen?" The merchant can provide voice commands via the voice-activated component to provide further input, such as correcting a candidate value or confirming the candidate value for the feature in question. Once all required features have matched candidate values the merchant may be informed that the listing or offer will be placed successfully. In embodiments, the voice-activated component may be associated with a speaker component for providing queries and responses generated by the extraction module 302 and processor 218. In embodiments, the voice-activated component and speaker component may be associated with user devices 204 and the processor 212 may be configured to implement and perform the steps described herein including the operations for extraction module 302.

In some embodiments the weight factor module 304 may be configured to generate and assign a weight factor or value to a particular merchant, seller, or user that provides items for sale using the item offer feature described herein. The assigned weight factor or value may be used to alter the input provided by the user when confirming a candidate value or selecting another candidate value for a feature in an item offer generation process described herein. For example, the input provided by a given user may be utilized to update a model for the item or item category in question. The weighting factor can be used to affect the impact or overall relevance of the input provided by each merchant. In embodiments, the weight factor or value may be assigned or determined based in part on previous input provided by the merchant, peer reviews, buyer reviews, or other suitable criteria such as a new listing entity versus a veteran listing entity with an electronic marketplace. In embodiments, the weight factor module 304 may update the appropriate weight value or factor for the merchant based on their responses and the veracity of their responses. For example, the extraction module 302 may identify that the image provided for an item includes a black color laptop yet the merchant intending to sell the item has indicated that the actual color is red. In embodiments, the conflicting data points may be used to update the weight factor or value for the merchant providing the input.

In embodiments, the algorithm module 306 may be configured to generate a plurality of models using machine learning algorithm techniques that are used to extract candidate values from information sources such as unstructured text, images, reviews of items maintained by an electronic marketplace, and generate confidence scores for a match between a particular candidate value and a feature. The confidence score may represent a likelihood that a given candidate value is correct for a feature given the information provided by the merchant when intending to offer an item and other contextual cues such as the item included in the image, etc. In embodiments, the algorithm module 306 may be configured to update the one or more models based on input provided by merchants when confirming candidate values, selecting alternate candidate values, or manually providing the candidate values. In embodiments, the algorithm module 306 may generate a plurality of models for each item and/or item category and store such models in a generated model store 310. The stored models may be quickly recalled once an item or item category has been identified thus saving computational resources for generating a new model each time a merchant intends to offer an item. In some embodiments, the algorithm module 306 may maintain a plurality of thresholds for each item and/or item category that identifies a number of manual input provided by a merchant that indicates that a new model is required for the item and/or item category, or that a different model should be utilized in subsequent analyzing for the item and/or item category in question. For example, a user that provides manual input for three out of five features for an item may be utilized as a data point in determining whether to generate a new model for the item or switching to an alternate model for subsequent submissions by a merchant intending to offer the item.

In some embodiments, the filtering module 308 may be configured to select a subset or portion of candidate values for inclusion or association with a feature. The filtering module 308 may be configured to rank a plurality of candidate values based on associated confidence scores and select a portion of the ranked candidate values based on a threshold associated with the item or item category. In some embodiments, the filtering module 308 may be configured to select the portion or subset of candidate values based on information that identifies a viewing surface or display size that a user is utilizing (i.e., a device type that the user utilized to initiate the item offer feature such as a mobile phone with a smaller display size as opposed to a laptop computer with a larger display size). In embodiments, the filtering module 308 may provide the ranked portion of candidate values to the autofill module 230 for populating appropriate fields related to a feature for presentation to a merchant.

In embodiments, the autofill module 230 may be configured to generate a user interface, data object, application object, or other suitable data file for presenting candidate values, features, an image of the item, and other relevant information (such as a price for the item) used to offer an item. The autofill module 230 may be configured to transmit or present the user interface to a user that utilizes the item offer feature described herein. In some embodiments, the autofill module 230 may be configured to receive and process input provided by a merchant interacting with the user interface and provide input to other components (302-308) for updating models, etc. In embodiments, the autofill module 230 may be configured to generate a web page, data object, or other suitable file for listing or offering the item using the candidate values selected or confirmed by the merchant for associated features on behalf of the user. Once the web page has been generated, the autofill module 230 may generate a transmit a confirmation message or notification to the user indicating that the item has been successfully listed. In some embodiments, the autofill module 230 may be configured to generate and provide a rejection message that details missing information that needs to be provided by a merchant in order to properly identify features and candidate values for listing an item. For example, a merchant that merely provides a blank image and text that describes a projector may receive a message that indicates more information needs to be provided before candidate values and features can be determined. For example, the message may identify that an image of the projector must be provided along with some additional unstructured or structured text describing the item.

Figure 4:
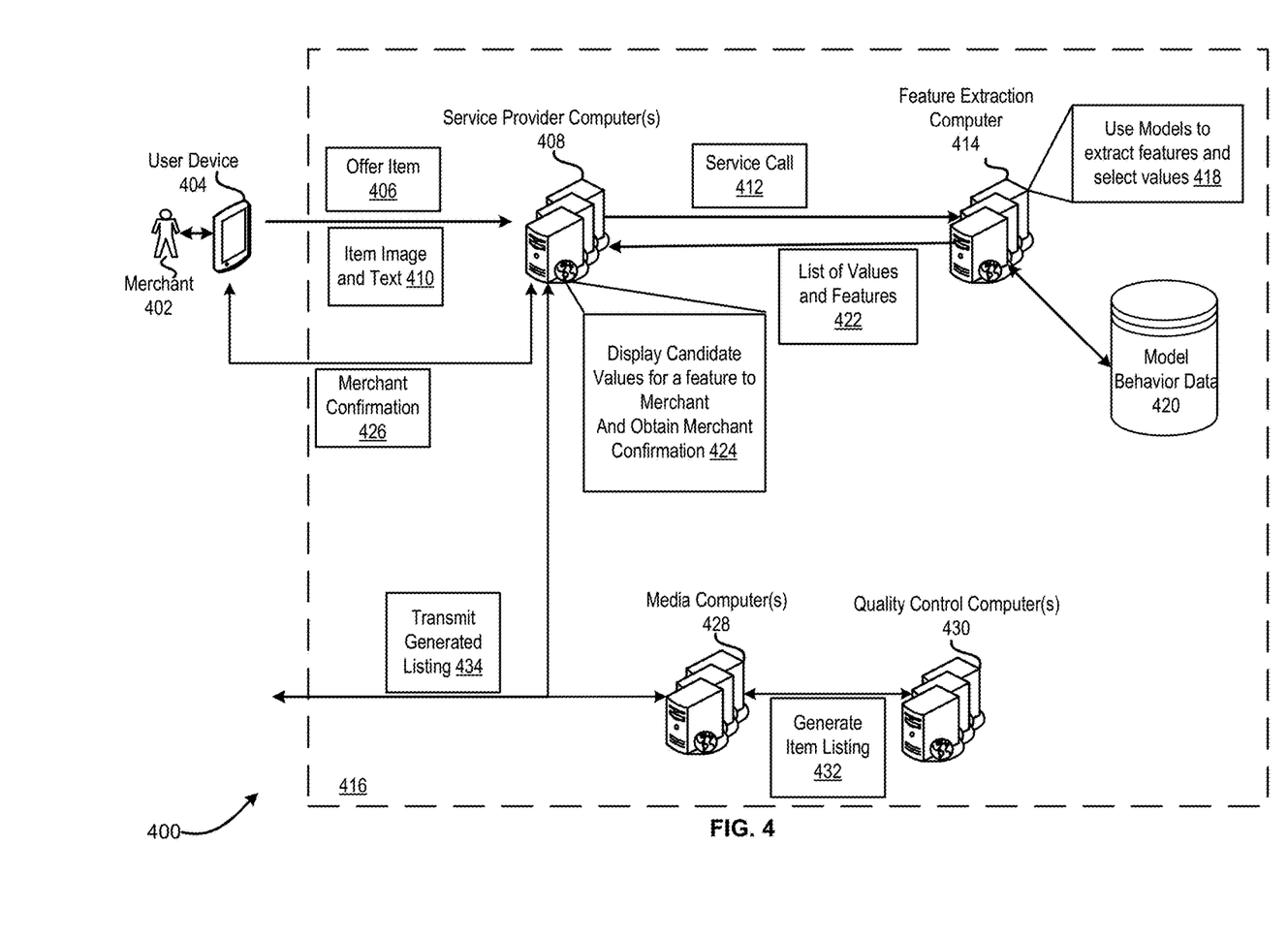
FIG. 4 illustrates an example workflow for an item offer feature, in accordance with at least one embodiment.

FIG. 4 illustrates an example workflow for an item offer feature, in accordance with at least one embodiment. FIG. 4 includes an example workflow and data flow 400 for an item offer feature according to embodiments. The data flow 400 includes a merchant 402 interacting with a user device 404 (such as a tablet computer) to provide information indicating an intention to offer an item 406 to service provider computers 408. The offer of the item 406 may include an item image and associated text 410. In embodiments, the service provider computers 408 may invoke a service call 412 (which may be an application programming interface call) to a feature extraction computer 414. The service provider computers 408 and feature extraction computer 412 may be associated with an electronic marketplace 416 (as represented by the dashed lines) that may be communicated with by the user device 404 via available networks (such as the Internet). Components within the electronic marketplace 414 may communicate via private or public networks. In some embodiments, the feature extraction computer 414 may be configured to use models, generated by a machine learning algorithm, to extract and identify features and candidate values 418 using the information (410) provided by the merchant 402 and other information sources as described herein. In embodiments, the feature extraction computer 414 may be configured to communicate and store model behavior data such as input provided by a merchant 402 confirming a candidate value for a feature, or values and features identified for an item in a data store such as data store 420 for future recall and use by the item offer feature described herein.

In FIG. 4, the feature extraction computer 414 may provide the list of candidate values and associated features 422 to the service provider computers 408. As described herein, the feature extraction computer 414 may select a portion or subset of candidate values to associate with each key feature based on a generated confidence score for each value. The candidate values included in the portion or subset of candidate values may be ranked based on their respective confidence scores. In embodiments, the service provider computer 408 may be configured to generate a user interface that represents a preview of the item listing for the item and display it to the merchant for confirmation. For example, the merchant 402 may utilize the user device 404 to confirm a particular candidate value for a feature, select an alternate candidate value included in the subset or portion of candidate values for the feature, or manually input a value for a feature. In embodiments, the merchant 402 may provide merchant confirmation 426 for one or more of the candidate values and corresponding features for the intended offer item 406. As described herein, the merchant confirmation 426 may be utilized as a data point by the machine learning algorithms to update appropriate models for the item or item category included in the item offer 406.

FIG. 4 illustrates the service provider computer 408 in communication with other components of the electronic marketplace 416 such as media computers 428 and quality control computers 430. In embodiments, the media computers 428 and quality control computers 430 may be configured to generate a web page, user interface, or data object that represents an item listing 432 for the item offer 406 that incorporates the item image and text 410 as well as the candidate values confirmed by the merchant 402 for one or more features of the item offer 406. The media computers 428 and quality control computers 430 may be configured to generate an appropriate item listing 432 that adheres to the electronic market place's 416 policies and standards including the removal of certain images, text, and features based on the item and item category for the item offer 406. In embodiments, the media computers 428 and quality control computers 430 may transmit the generated listing 434 for hosting to a third party or to another component of the electronic marketplace 416 for properly listing and/or offering the item in the electronic marketplace. In some embodiments, the service provider computers 408 may be configured to generate and transmit an item listed confirmation message to the merchant that identifies that the item offer 406 has successfully been listed.

Figure 5:
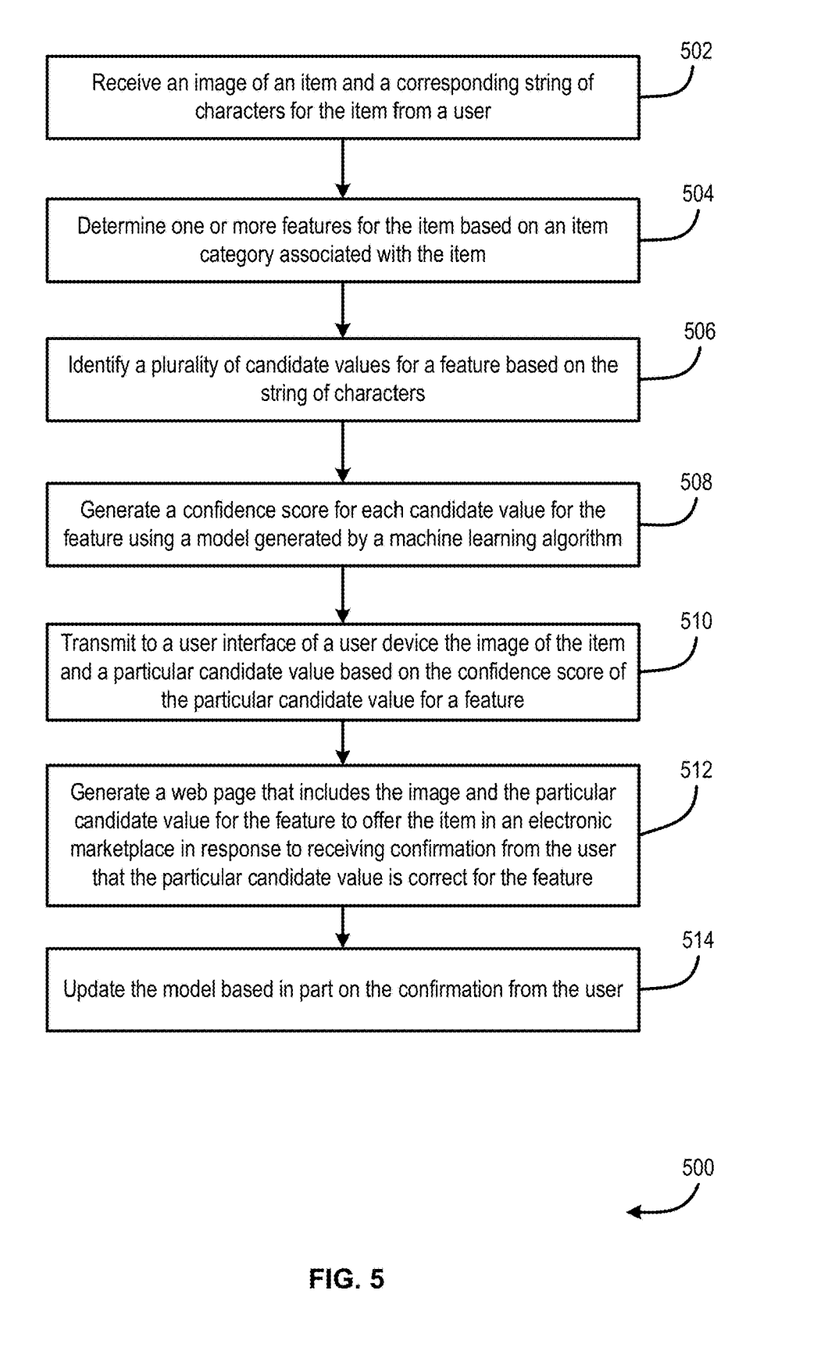
FIG. 5 illustrates an example flow chart for an item offer feature, in accordance with at least one embodiment.
Figure 6:
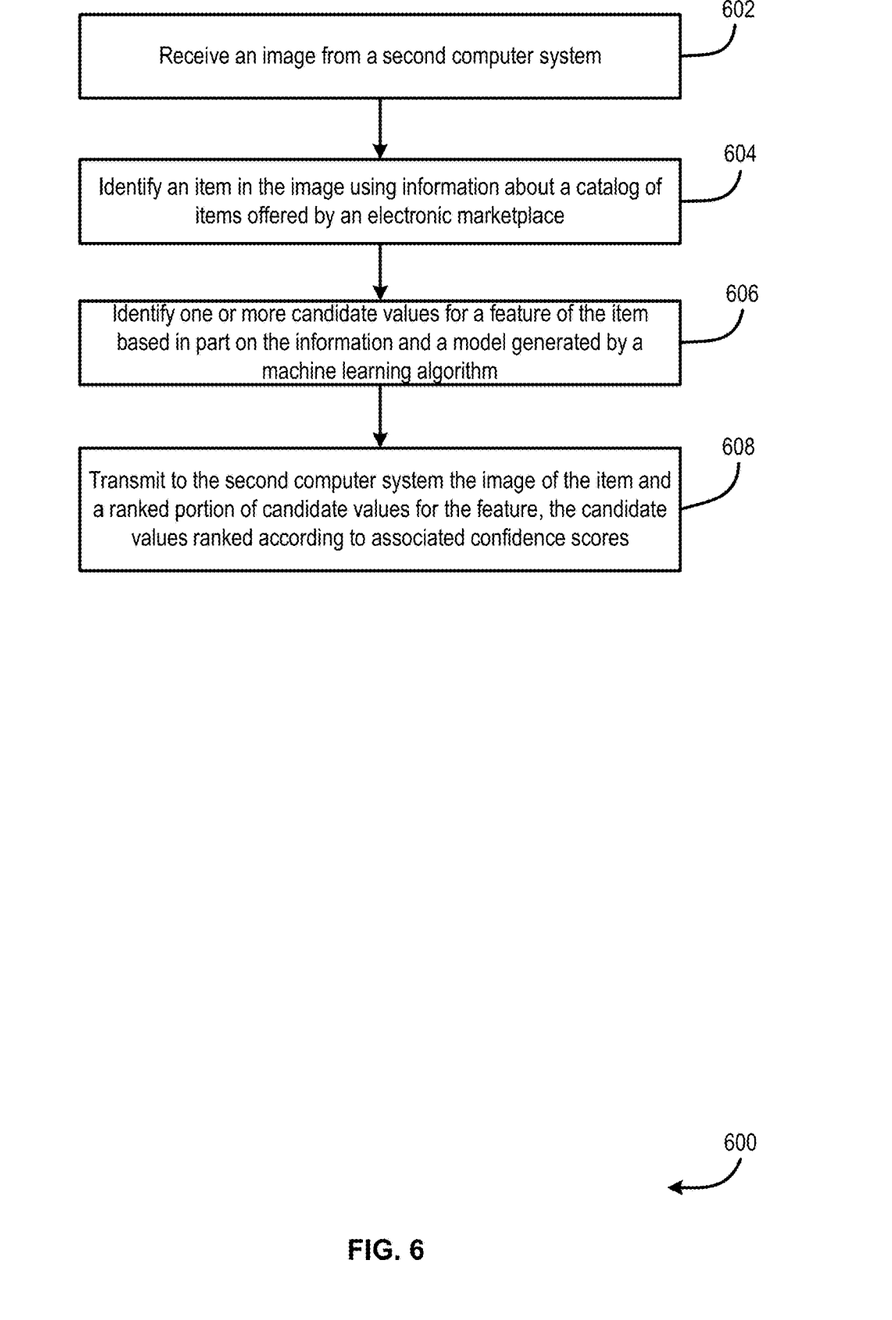
FIG. 6 illustrates an example flow chart for an item offer feature, in accordance with at least one embodiment.

FIGS. 5 and 6 illustrate example flows for an item offer feature, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Additionally, some, any, or all of the process (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

In some examples, the one or more service provider computers (one or more service computers) 206 (e.g., utilizing at least one of the autofill module 230, the extraction module 302, the weight factor module 304, the algorithm module 306, or the filtering module 308) shown in FIGS. 2 and 3, may perform the processes 500 and 600 of FIGS. 5 and 6. In FIG. 5 the process 500 may include receiving an image of an item and a corresponding string of characters for the item from a user at 502. In an embodiment, the user may be a merchant that desires to sell an item on an electronic marketplace. The string of characters may include unstructured text that may include relevant and correct information (values) for key features associated with the item. The process 500 may include determining one or more features for the item based on an item category associated with the item at 504. In embodiments, an item in an item category may have a threshold amount of key features that must be associated with values in order to properly list and offer the item. The threshold amount of key features may be different for each item category. For example, a pen may only require a color of ink and a writing type (i.e., ball, pinpoint, etc.,) whereas a laptop computer may have a plurality of key features such as display size, battery life time, hard disk size, memory size, processor speed, etc.

The process 500 may include identifying a plurality of candidate values for a feature based on the string of characters at 506. In embodiments, the plurality of candidate values for a feature may be included in the string of characters, may be extracted from similar products within the same item category, from a manufacturer of the item, or from other sources described herein. A candidate value and attribute extraction process that may be utilized is described in related U.S. patent application Ser. No. 14/314,962 titled "ATTRIBUTE FILL USING TEXT EXTRACTION," which is herein incorporated by reference. The process 500 may include generating a confidence score for each candidate value for the feature using a model that is generated by a machine learning algorithm at 508. In embodiments, the confidence score may represent the likelihood of the candidate value being correct for the feature in question given the item provided by the user and the item category. The process 500 may include transmitting, to a user interface of a user device, the image of the item and a particular candidate value based on the confidence score of the particular candidate value for a feature at 510. In some embodiments, the user interface may include one or more inter-actable selections, menus, drop downs, or buttons for selecting the particular candidate value from a portion or subset of candidate values that are selected and presented to the user based on their respective confidence scores. In various embodiments, the portion or subset of candidate values selected for presentation to the user via the user interface may be ranked and a certain number of the ranked candidate values may be provided in the user interface based on a threshold. In embodiments, the threshold may identify a number of the candidate values to display based on a type of user device (i.e., a laptop display screen as opposed to a mobile phone display screen) or other types of characteristics such as item category or monetary value for the item.

The process 500 may include generating a web page that includes the image and the particular candidate value for the feature to offer the item in an electronic marketplace in response to receiving confirmation from the user that the particular candidate value is correct for the feature at 512. In embodiments, the user may interact with the user interface to confirm the particular candidate value for a feature of one or more features for listing the item. If the particular candidate value is incorrect the user may utilize the user interface to select another potential candidate value for the feature from a subset or portion of candidate values selected by the service provider computers. Should none of the presented candidate values be correct for the feature, the user may interact with the user interface to provide the correct value for the feature manually. The process 500 may conclude at 514 by updating the model based in part on the confirmation from the user about the particular candidate value for the feature. In embodiments, the selection of the particular candidate value, the selection of another potential candidate value from the portion of candidate values, or the manual input of a value for the feature may all be useful data points that are further used to update the model.

The process 600 may include receiving an image from a second computer system at 602. In some examples, the second computer system may be a user device associated with a user. For example, a user may desire to sell a piece of furniture, clothing, or electronic device in their possession. The user may capture an image of the item for offer and transmit it to the service provider computer that implements the item offer feature described herein over one or more available networks (i.e., the Internet). In some embodiments, the user device can capture an augmented reality image of the item for sale, a video, or a picture of the item and provide it to the service provider computer to begin the item offer feature described herein. In various embodiments, a user may interact with a voice-activated component to begin the item offering process described herein. For example, a user may state "I wish to sell these tennis shoes," to the voice-activated component. The voice-activated component may convert the speech to appropriate text which can then be processed similar to an image that was provided. In some embodiments, the second computer system may be associated with an entity or organization such as a merchant or online merchant. The process 600 may include identifying an item in the image using information about a catalog of items offered by an electronic marketplace at 604. In some embodiments, an item in the image may be identified using image recognition techniques that further utilize a corpus of items and information provided by an electronic marketplace (i.e., items currently offered by an electronic marketplace), to find similar items. As described herein, suitable image recognition techniques may include one or more of barcode and/or label matching, image characteristics processing, optical character recognition techniques, image fragmentation and/or user provided tags/metadata procedures.

The process 600 may include generating one or more candidate values for a feature of the item based in part on the information at 606. As described herein, one or more key features may be identified for the item based on an item category associated with the item and the one or more candidate values may be extracted from unstructured/structured text provided by the user with the image, similar items in an item catalog, manufacturers, reviews of the item, or question and answer features related to a similar item that are maintained by an electronic marketplace. The process 600 may conclude at 608 by transmitting to the second computer system the image of the item and a ranked portion of candidate values for the feature where the candidate values are ranked according to associated confidence scores. In embodiments, a machine learning algorithm using a model may generate and assign the confidence scores to each potential candidate value and then rank the candidate value to confidence score pairs for each feature. The process may include generating a web page to offer the item identified in the image using a particular candidate value of the ranked portion of candidate values for the feature that was selected based on input from a user. In some embodiments, the item offer feature generates a data object, media object (i.e., picture, movie, audio clip, etc.,) user interface, or application notification for offering the item. In various embodiments, the user's input may confirm the particular candidate value for a feature before the web page or other data object is generated for offering the item, for example on an electronic marketplace.

Figure 7:
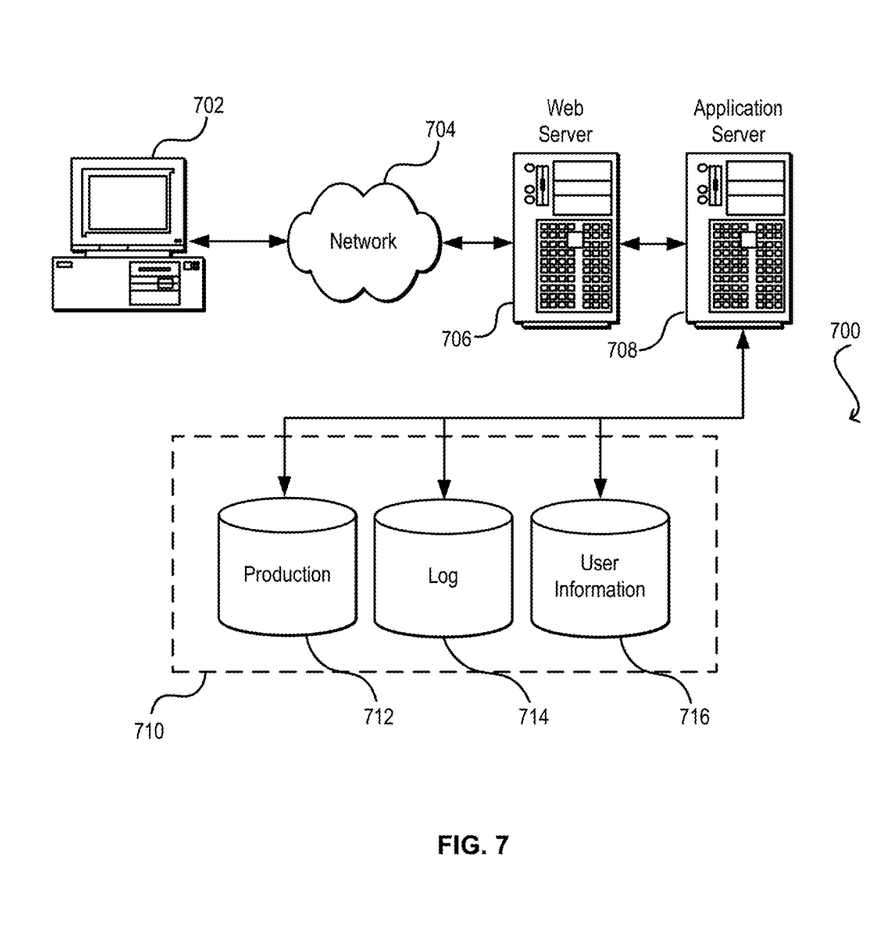
FIG. 7 illustrates an environment in which various embodiments can be implemented.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented artificial intelligence method, comprising:
    receiving, by a computer system, an image of an item and corresponding text for the item from a user device of a user;
    determining, by the computer system, one or more features for the item that are required to offer the item in an electronic marketplace based at least in part on an item category associated with the item and a threshold amount of features associated with the item category;
    identifying, by the computer system, a plurality of candidate values for a feature of the one or more features based at least in part on the corresponding text;
    generating, by the computer system using a machine learning algorithm and a model, a confidence score for an individual candidate value of the plurality of candidate values for the feature;
    transmitting, by the computer system to a user interface of the user device, the image of the item and a particular candidate value of the plurality of candidate values for the feature based in part on the corresponding confidence score, the particular candidate value associated with a portion of candidate values;
    receiving, by the computer system and from the user interface of the user device, an indication that identifies confirmation, by the user, that the particular candidate value is correct for the feature;
    in response to the user confirming, via the user interface, that the particular candidate value is correct for the feature:
        generating, by the computer system, a web page that comprises the image, the particular candidate value, and the feature, the web page configured to offer the item in the electronic marketplace; and
        updating, by the computer system, the model based in part on the received indication from the user interface of the user device.

2. The computer-implemented method of claim 1, wherein the machine learning algorithm generates the model that is used to generate the confidence score.

3. The computer-implemented method of claim 2, further comprising selecting, by the computer system, a particular model generated by the machine learning algorithm for generating the confidence score based in part on the item category.

4. The computer-implemented method of claim 2, further comprising in response to the user confirming, via the user interface, that the particular candidate value is incorrect for the feature:
   selecting, by the computer system, a different model for generating the confidence score in response to receiving subsequent items from the item category.

5. The computer-implemented method of claim 1, further comprising in response to the user confirming, via the user interface, that the particular candidate value is incorrect for the feature:
   requesting, by the computer system and via the user interface, input from the user, the input utilized as the candidate value for the feature.

6. A computer-implemented method, comprising:
   a step for receiving, by a first computer system, an image from a second computer system;
   a step for identifying, by the first computer system, an item in the image based in part on image recognition using information corresponding to a catalog of items maintained by the computer system;
   a step for determining, by the first computer system, one or more features for the item based at least in part on an item category associated with the item and a threshold amount of features associated with the item category;
   a step for identifying, by the first computer system, one or more candidate values for a feature of the one or more features for the item based at least in part on the information and a model generated by a machine learning algorithm; and
   a step for transmitting, by the first computer system to the second computer system, the image of the item and a ranked portion of candidate values of the one or more candidate values for the feature, the ranked portion of the candidate values ranked based on confidence scores associated with each candidate value of the portion of candidate values.

7. The computer-implemented method of claim 6, further comprising a step for, in response to receiving input from the second computer system, generating a web page to offer the item identified in the image using a particular candidate value of the ranked portion of candidate values for the feature, the particular candidate value selected based in part on the input.

8. The computer-implemented method of claim 7, wherein the input received from the second computer system is verified based in part on image characteristics obtained, by the first computer system, of the item in the image.

9. The computer-implemented method of claim 6, wherein transmitting the image of the item and the ranked portion of candidate values for the feature is based in part on a type of the second computer system used to provide the image to the first computer system, a number of the ranked portion of candidate values selected based on the type of the second computer system.

10. The computer-implemented method of claim 6, wherein a user that is associated with the second computer system is further associated with a weighting factor by an electronic marketplace, the weighting factor determined based on previous responses by the user to the electronic marketplace.

11. The computer-implemented method of claim 10, wherein the model is updated accordingly based on the weighting factor of the user that provides the input.

12. The computer-implemented method of claim 6, further comprising a step for transmitting, by the first computer system and to the second computer system, confirmation that the item is being offered in an electronic marketplace.

13. A system, comprising:
   a processor;
   a speaker component;
   a voice-activated component configured to receive audio; and
   a memory device comprising computer-executable instructions that, when executed by the processor, cause the system to:
      receive, via the voice-activated component, a voice command about an item;
      identify the item from an item catalog based in part on the voice command;
      identify one or more features for the item based in part on an item category for the item and a threshold amount of features associated with the item category;
      transmit, via the speaker component, a series of queries, the series of queries comprising one or more candidate values for a feature of the one or more features, the one or more candidate values determined based in part on first information about the item;
      receive, via the voice-activated component, individual responses to the series of queries; and
      generate a web page for offering the item that comprises an image of the item and a particular candidate value of the one or more candidate values for the feature based at least in part on the individual responses.

14. The system of claim 13, wherein the one or more candidate values for the feature are determined based in part on second information from a manufacturer of the item.

15. The system of claim 13, wherein the one or more candidate values for the feature are determined based in part on second information maintained by an electronic marketplace, the second information comprising reviews of the item.

16. The system of claim 13, wherein the one or more candidate values for the feature are determined based in part on second information maintained by an electronic marketplace, the second information comprising responses provided by a plurality of users of the electronic marketplace in response to queries provided by a subset of the plurality of users.

17. The system of claim 13, wherein receiving the voice command about the item comprises using a speech-to-text conversion that generates a string of characters.

18. The system of claim 17, wherein identifying the item from the item catalog comprises using the string of characters and a corpus of item descriptions included in the item catalog.

19. The system of claim 13, wherein the series of queries are ranked based in part on a machine learning algorithm that generates a confidence score for each query of the series of queries, the confidence score representing a match for the candidate value for the feature.

* * * * *